No. 874,075.   
PATENTED DEC. 17, 1907.  
W. S. HOVEY.  
VARIABLE SPEED TRANSMISSION AND REVERSING GEAR.  
APPLICATION FILED JAN. 16, 1907.  
3 SHEETS—SHEET 1.
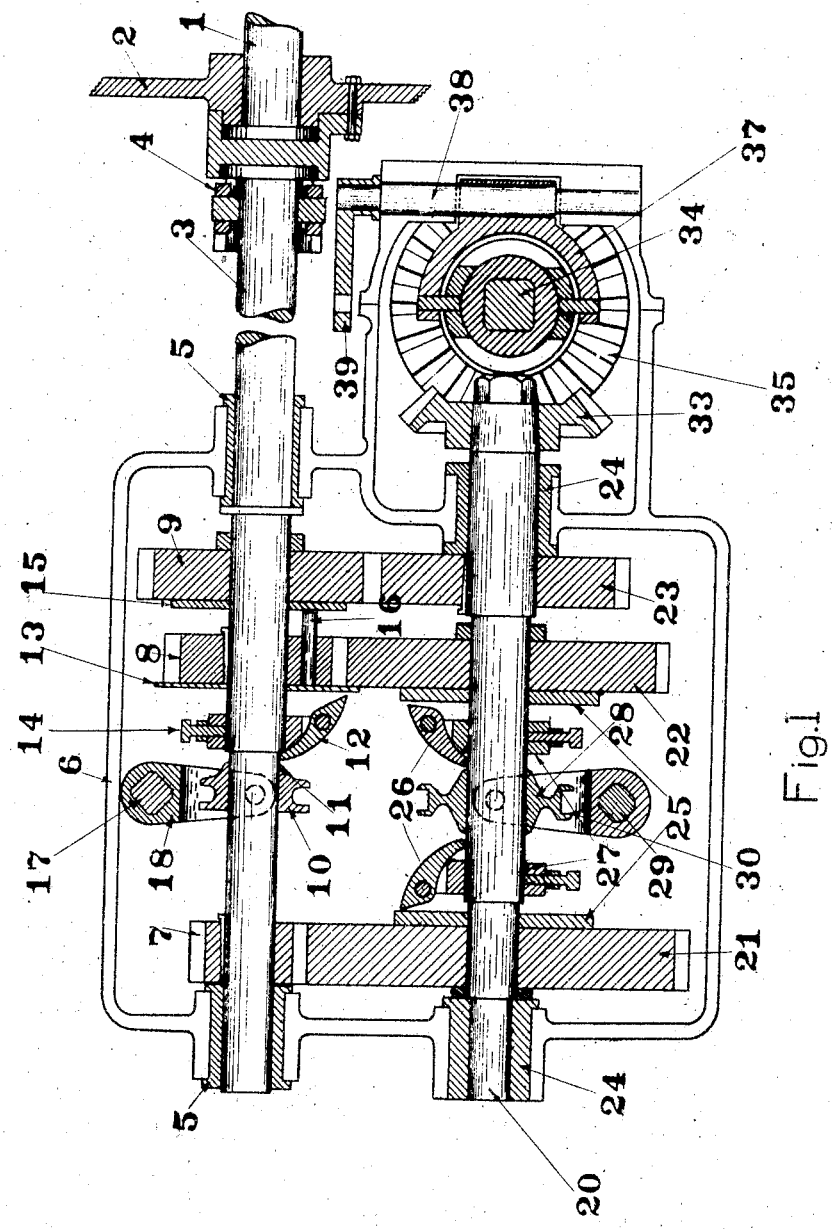

No. 874,075. PATENTED DEC. 17, 1907.
W. S. HOVEY.
VARIABLE SPEED TRANSMISSION AND REVERSING GEAR.
APPLICATION FILED JAN. 16, 1907.
3 SHEETS—SHEET 2.
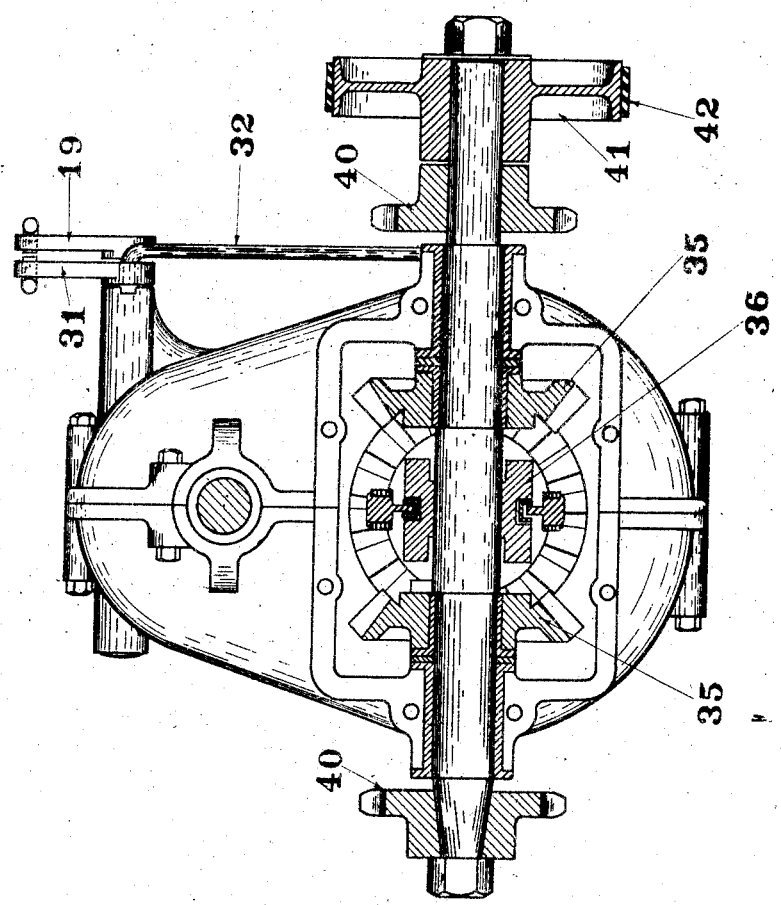
Fig. II

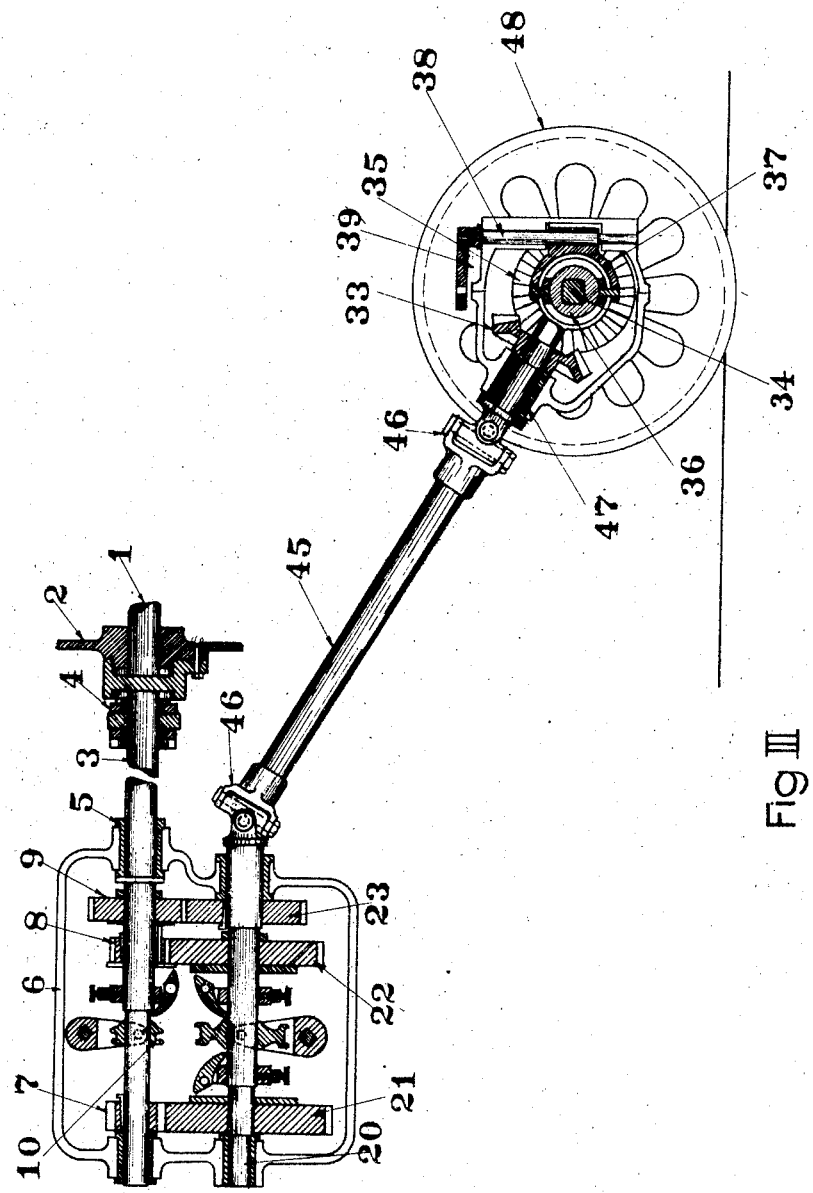

UNITED STATES PATENT OFFICE.

WILLIAM S. HOVEY, OF THREE RIVERS, MICHIGAN, ASSIGNOR TO SHEFFIELD CAR COMPANY, OF THREE RIVERS, MICHIGAN.

VARIABLE-SPEED TRANSMISSION AND REVERSING GEAR.

No. 874,075.     Specification of Letters Patent.     Patented Dec. 17, 1907.

Original application filed October 18, 1906, Serial No. 339,534. Divided and this application filed January 16, 1907. Serial No. 352,645.

*To all whom it may concern:*

Be it known that I, WILLIAM S. HOVEY, a citizen of the United States, residing at the village of Three Rivers, county of St. Joseph, State of Michigan, have invented certain new and useful Improvements in Variable-Speed Transmission and Reversing Gears, of which the following is a specification.

This invention relates to improvements in variable speed transmission and reversing gears.

The main object of this invention is to provide an improved variable speed and reversing transmission gear with which a vehicle, such as a locomotive or motor vehicle, can be driven in either direction with equal facility.

My improved transmission gear is particularly designed for use in motor vehicles or in locomotives, such as are illustrated in my application for Letters Patent, filed October 18th, 1906, Serial Number 339,534, this application being a division thereof, although it is adapted for use in various other relations.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a detail central longitudinal section through a structure embodying the features of my invention. Fig. 2 is a vertical section through my improved transmission gear, showing the means whereby the reversing is accomplished. Fig. 3 is a detail longitudinal section, showing the driven shaft of my improved transmission and reversing mechanism adapted as the axle of a locomotive or motor vehicle.

In the drawing, similar reference characters refer to similar parts throughout the several views.

Referring to the drawing, 1 represents the crank shaft of an engine, and 2 the balance wheel thereof. The crank shaft 1 is connected to the driving shaft 3 of the variable speed gear, preferably by a universal joint 4.

The bearings 5 for the shaft 3 are preferably supported by the gear casing 6. The details of this joint, or coupling, 4 are not here illustrated nor described, as it may be of any suitable form of the so-called universal joint. By thus joining the crank shaft to the shaft 3 of the variable speed gear, the parts are not injured by the vibration of the engine, or the springing of the frame, whereby the parts might get out of alinement.

On the shaft 3 are gears 7, 8 and 9; the gears 7 and 8 being fixed to the shaft, and the gear 9 being revolubly mounted thereon. The gear 9 is detachably secured or clutched to the shaft by means of a clutch mechanism preferably consisting of a sliding grooved collar 10 having a conical surface portion 11 adapted to engage the end of the pivoted dog 12 to force it into engagement with the plate 13 slidably mounted upon the shaft.

A friction disk 15 is mounted upon the shaft to engage the gear 9. The friction disks are operatively connected by means of the pins 16, which are arranged loosely through the gear 8 by which they are carried, so that, when the plate is clamped up by the dogs, the plate 15 is gripped against its gear. The dog 12 is mounted upon a suitable collar 14. Arranged above the shaft 3 and transversely thereof is a rock shaft 17 having a forked arm 18 adapted to engage the clutch collar 10 for shifting the same. On the outer end of the shaft 17 is an arm 19 to which the operating rod is connected.

Arranged parallel with the driving transmission shaft 3 is a shaft 20. The shaft 20 is arranged in suitable bearings 24 provided therefor in the casing 6. On the shaft 20 are gears 21, 22 and 23, the gears 21 and 22 being revolubly mounted upon the shaft and the gear 23 being fixed thereto. The gear 21 is arranged to mesh with the gear 7 on the shaft 3, the gear 22 with the gear 8, and the gear 23 with the gear 9. The gears 21 and 22 are secured, or clutched, to the shaft 20 by means of a clutch mechanism preferably consisting of the friction disks 25, which are locked against the gears by the dogs 26, these dogs being pivoted on the collars 27 fixed to the shaft. The grooved clutch collar 28 is provided with conical surfaces which, when forced under the dogs, clamp them against the friction disks or plates, thereby locking the gears to the shaft. When the collar is in a central position, neither of the gears is clutched. The clutch collar 28 is shifted by means of the rock shaft 29 having forked arms 30 thereon, arranged to engage the collar. This rock shaft is operated through the crank lever 31, which is connected thereto by means of the link 32.

Arranged transversely of the shaft 20 is a driven shaft 34, having beveled gears 35 revolubly mounted thereon with which the beveled gear 33 on the shaft 20 is arranged to mesh. Either of these gears 35 may be secured to the shaft by means of the jawed clutch 36, which is slidably mounted on the shaft. This clutch is operated by the bifurcated arm 37, so that it may be shifted to lock either gear desired to the shaft and thereby change the direction in which it is driven.

When the clutch is in its central or normal position, neither gear is secured so that the driven shaft is entirely freed from the variable speed mechanism. The clutch 36 is shifted by means of the rock shaft 38, by which the bifurcated arm 37 is carried, the rock shaft 38 being provided with an operating arm 39. The driven shaft 34 is provided with a pair of sprockets 40 through which the shaft may be connected to the driving axles, as clearly appears in my application for Letters Patent above referred to. The shaft 34 is also provided with a brake wheel or drum 41 having a suitable brake band 42 thereon. The mechanism for operating this brake band will be readily understood, and, as it forms no part of this invention, it is not here illustrated.

In the modification shown in Fig. 3, the driven shaft 34 is adapted as the axle for a motor vehicle having wheels 48 thereon. The beveled gear 33 in this construction is carried by the shaft 47 flexibly connected by the tumbling-rod 45 and the universal joints 46 to the shaft 20. This, of course, obviates the necessity for the sprocket wheels 40.

By means of my improved transmission and reversing mechanism, described, the motor or locomotive may be driven in either direction with equal facility at three speeds. It is evident that the same could be modified to secure a varied number of speeds by the addition of further gears and clutches and it is also evident that the variable speed portion of the mechanism can be further varied and valuable and desirable results still be secured.

I have illustrated and described my improved locomotive in detail in the form preferred by me on account of its structural simplicity and economy. I am aware, however, that it is capable of considerable variation in structural details without departing from my invention.

Having thus described my invention, what I claim as new and desire to secure by Letters Patent is:

1. The combination with an engine crank shaft, of a transmission gear, comprising a driving transmission shaft 3 connected to said engine crank shaft by a universal joint; gears 7, 8 and 9 arranged on said driving transmission shaft, said gears 7 and 8 being fixed thereto, and said gear 9 being revolubly mounted thereon; a clutch for securing said gear 9 to said shaft; a transmission shaft 20; gears 21, 22 and 23 arranged on said transmission shaft 20 to mesh with said gears 7, 8 and 9, respectively, said gears 21 and 22 being revolubly mounted on said shaft and said gear 23 being fixed thereon; a clutch mechanism for securing said gears 21 and 22 to said shaft 20; a beveled gear on said shaft 20; a driven shaft; a pair of beveled gears revolubly mounted on said driven shaft arranged to mesh with said beveled gear on said shaft 20; and a clutch mechanism by which either of said gears on said driven shaft may be connected thereto, substantially as described.

2. The combination with an engine crank shaft, of a transmission gear, comprising a driving transmission shaft; gears 7, 8 and 9 arranged on said driving transmission shaft, said gears 7 and 8 being fixed thereto, and said gear 9 being revolubly mounted thereon; a clutch for securing said gear 9 to said shaft; a transmission shaft 20; gears 21, 22 and 23 arranged on said transmission shaft 20 to mesh with said gears 7, 8 and 9, respectively, said gears 21 and 22 being revolubly mounted on said shaft and said gear 23 being fixed thereon; a clutch mechanism for securing said gears 21 and 22 to said shaft 20; a beveled gear on said shaft 20; a driven shaft; a pair of beveled gears revolubly mounted on said driven shaft arranged to mesh with said beveled gear on said shaft 20; and a clutch mechanism by which either of said gears on said driven shaft may be connected thereto, substantially as described.

3. In a structure of the class described, a variable speed mechanism comprising a shaft 3; gears 7, 8 and 9 arranged on said shaft, said gears 7 and 8 being fixed thereto and said gear 9 being revolubly mounted thereon; a clutch for securing said gear to said shaft, consisting of a grooved collar arranged between said gears 7 and 9; a pivoted dog mounted on said shaft, arranged to be engaged by said collar; a friction plate arranged to engage said gear 9; a pin arranged through said gear 8; a plate slidably mounted on said shaft arranged to be clamped against said pin by said dog; and means for shifting said collar; a second shaft; gears 21, 22 and 23 arranged to mesh with said gears 7, 8 and 9, respectively, said gears 21 and 22 being revolubly mounted on said shaft and said gear 23 being fixed thereto; clutch mechanism for securing said gears 21 and 22 to said shaft comprising a pair of friction plates, a pair of pivoted dogs mounted on said shaft, and a collar slidably mounted on said shaft adapted to engage either of said dogs as desired.

4. In a structure of the class described, the combination of a driving shaft; gears 7, 8 and 9 arranged on said driving shaft, said gears 7 and 8 being fixed thereto and said gear 9 being revolubly mounted thereon; a clutch for securing said gear 9 to said shaft, arranged with its actuating mechanism between said gears 7 and 8; a second shaft; gears 21, 22 and 23 arranged on said second shaft to mesh with said gears 7, 8 and 9, respectively, said gears 21 and 22 being revolubly mounted on said shaft, and said gear 23 being fixed thereon; and a clutch mechanism arranged between said gears 21 and 22 for securing them to said shaft, for the purpose specified.

In witness whereof, I have hereunto set my hand and seal in the presence of two witnesses.

WILLIAM S. HOVEY. [L. S.]

Witnesses:
H. I. WRIGHT,
R. B. LINSLY.